W. A. DANCAN.
Hay Raker and Loader.
No. 54,133.
Patented April 24, 1866.
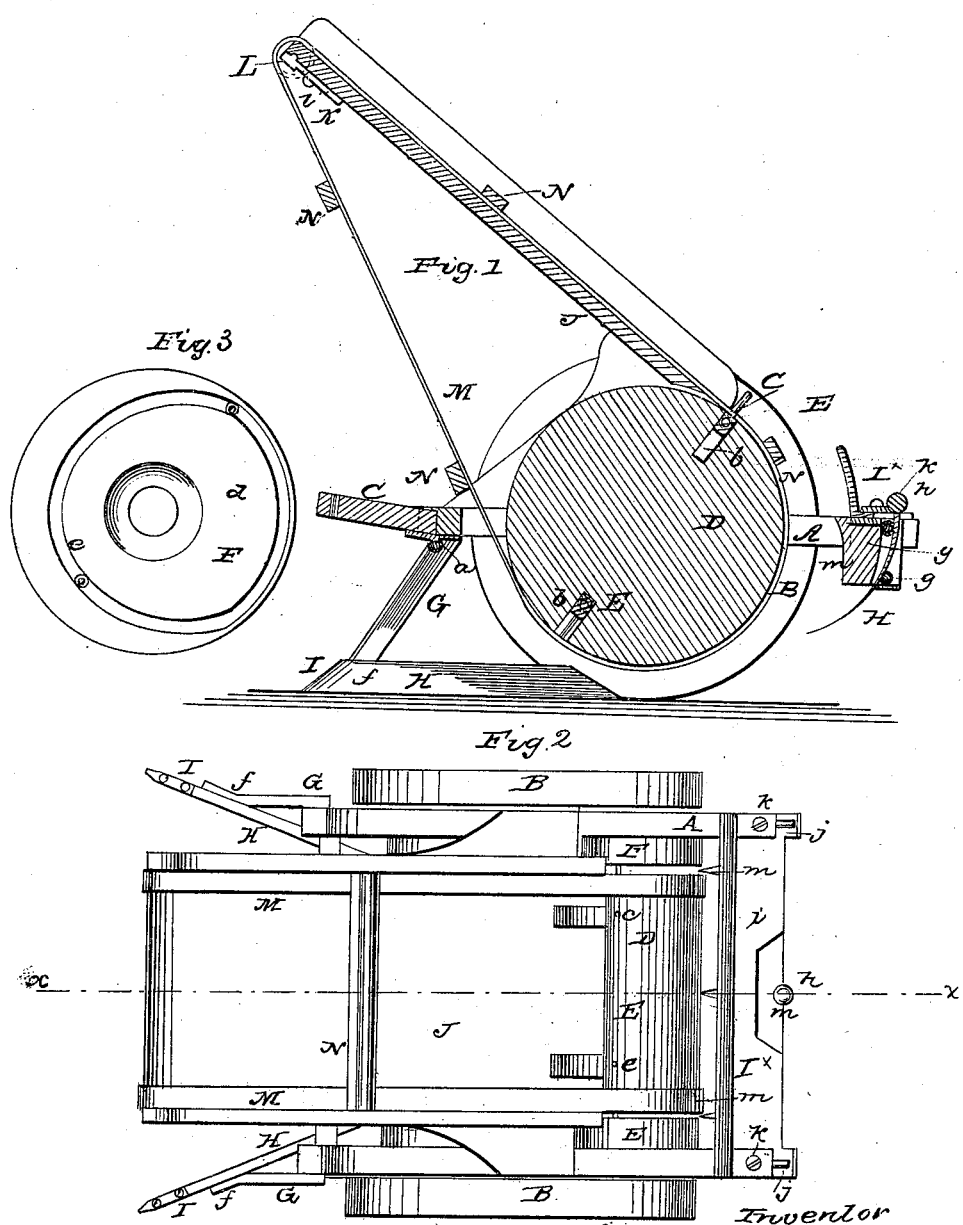

UNITED STATES PATENT OFFICE.

WILLIAM A. DUNCAN, OF SYRACUSE, NEW YORK.

IMPROVEMENT IN MACHINES FOR RAKING AND LOADING HAY.

Specification forming part of Letters Patent No. 54,133, dated April 24, 1866.

*To all whom it may concern:*

Be it known that I, WILLIAM A. DUNCAN, of Syracuse, in the county of Onondaga and State of New York, have invented a new and Improved Hay-Loading Device; and I do hereby declare that the following is a full, clear, and exact description thereof, which will enable those skilled in the art to make and use the same, reference being had to the accompanying drawings, forming part of this specification, in which—

Figure 1 is a side sectional view of my invention, taken in the line $x$ $x$, Fig. 2; Fig. 2, a plan or top view of the same; Fig. 3, a detached face view of one of the cams pertaining to the same.

Similar letters of reference indicate corresponding parts.

This invention relates to a new and improved device for loading hay on wagons or carts direct from the field, or while the wagon or cart is drawn along over the same.

The invention consists in the employment or use of gathering-boards provided with teeth, and arranged in such a manner as to cause the hay to be brought within the action of the rakes.

The invention also relates to an improvement in the connection whereby the device is secured to the wagon or cart to be loaded, and also in an improved arrangement of the stationary rake tooth or teeth, as well as an improved mode of operating the revolving rake-teeth.

The invention further consists in an adjustable holder, whereby the revolving rakes are made to act efficiently upon the hay and carry the same to the elevator.

A represents a rectangular frame, which is mounted on two wheels, B B, and has a draft-pole, C, attached to its front end by a hinge or joint, $a$, applied in such a manner that the pole, when not attached to the wagon or cart to be loaded, may drop down and serve as a leg or support for the front part of the machine.

D represents a cylinder, which is smaller in diameter than the wheels B B, but is fitted permanently on the same axle and within the frame A. This cylinder has two grooves, $b$ $b$, made longitudinally and radially in it at opposite sides of its axle, and in these grooves bars E are fitted and allowed to slide freely in a direction toward and from the axle. These bars E are rake-heads provided with teeth $c$, and the ends of said bars project beyond the ends of the cylinder, and have friction-rollers upon them, which work in cams F, attached to the frame A in a concentric position with the ends of the cylinder.

The cams F are constructed of blocks $d$, of circular or other form, having irregular curved grooves $e$ in their inner sides or surfaces, as shown in Fig. 3, said grooves being of such a form as to throw the teeth $c$ out from the groove $b$ in the cylinder as said teeth pass underneath the cylinder and approach a vertical line central with cylinder D and hold the teeth outward until they pass around and reach a vertical line central with the top of the cylinder, and then be drawn within the groove $b$. These cams dispense with all springs for operating the rakes, giving the latter a positive movement.

To each side of the frame, at its front end, there is attached a bar, G, and to the lower ends of these bars boards H are attached by pivots $f$. These boards have an oblique position, flaring outward at each side, as shown clearly in Fig. 2, and the front ends of the boards are beveled downward or inclined, as shown in Fig. 1, the front ends being rounded, so as to avoid being arrested by slight obstructions. To the inclined sides of these boards H H there are attached elastic teeth I, which extend down a trifle below the front ends of the boards H in order to gather in the hay. The rounded front ends of the boards H would admit of their passing over hay, but the teeth I catch and hold it and gather it in between the boards, while said teeth, on account of their elasticity, will, in case of meeting with obstructions, bend inward or yield or give so as to pass over them. The boards H, it will be seen, gather in a swath of hay of a width greater than the length of the cylinder D, and when the device is not in use, or is being drawn from place to place, the boards may, on account of being connected to the frame A through the medium of the pivoted bars G, be hoisted up out of the way.

The device is attached to the rear end of a wagon or cart by securing the pole C to it.

In the rear cross-bar of the frame A there is fitted vertically a curved tooth, H, (shown clearly in Fig. 1,) said tooth passing down between rollers $g\ g$, the upper one being in front of the tooth and the other at its rear side. This tooth H has a weight, $h$, upon its upper end, which weight has a tendency to keep the tooth down to a working position. One or more of these teeth H may be used. The rollers $g\ g$ admit of the weight $h$ operating perfectly, the teeth being allowed to rise, yield, or give to obstructions, and the weight, when the obstructions are passed, bringing the tooth immediately back to a working position.

On the top of the rear cross-bar of the frame A there is secured an angle-plate, $I^x$, the lower part, $i$, of which has oblong slots $j$ made in it for set-screws $k$ to pass through into the side pieces of the frame A. The upper part of this plate is slightly curved, corresponding with the curvature of the cylinder D, and the plate, on account of being attached to the frame A, as shown, may be adjusted nearer to or farther from the cylinder, as required.

J represents an inclined trough attached to the frame A, and having a tangential position relatively with the cylinder D. At the upper end of this trough J, at its under side, there is attached a plate, K, by set-screws $l\ l$, which pass through oblong slots in said plate and admit of the latter being adjusted farther in or out, as may be desired. At each end of this plate there is a roller, L, over which and the cylinder D belts M pass, having slats N secured to them. These slats N serve to carry the hay, which is raked up and carried upon the lower end of the trough J by the teeth $c$ of the revolving rakes in the cylinder D, up to the top of trough J, over which it is discharged into the wagon or cart.

The plate $I^x$ serves to keep the hay to the cylinder while being carried up by the revolving rakes, and the tooth or teeth H serve as retainers, preventing the escape of hay at the rear of the device.

In order to prevent the hay clogging or choking between the rear cross-bar of the frame A and the cylinder D on account of friction, I attach ribs $m$ to said cross-bar, a greater or less number of ribs being used. These ribs effectually prevent the binding or clogging of the hay.

Having thus described my invention, I claim as new and desire to secure by Letters Patent—

1. The arrangement of the folding gathering-boards H, bars G, and elastic teeth I, in combination with the frame A, all constructed and operating in the manner and for the purpose herein specified.

2. The loaded tooth H, one or more, fitted between rollers $g$ in the rear cross-bar of the frame A, substantially as and for the purpose specified.

3. The adjustable board or plate $I^x$, placed on the rear of frame A, in connection with the cylinder D, provided with rakes, substantially as and for the purpose set forth.

4. The arrangement of the sliding fork-bars E, cylinder D, and cams F, constructed and operating in the manner substantially as described.

5. The ribs $m$, attached to the inner side of the rear cross-bar of the machine, substantially as and for the purpose set forth.

6. The combination of the cylinder D, provided with sliding rakes, the elevators, adjustable tooth or teeth, and gathering-boards provided with elastic teeth, all arranged to operate substantially in the manner as and for the purpose herein set forth.

WILLIAM A. DUNCAN.

Witnesses:
PETER TAYLOR,
JOHN BARNEY.